UNITED STATES PATENT OFFICE.

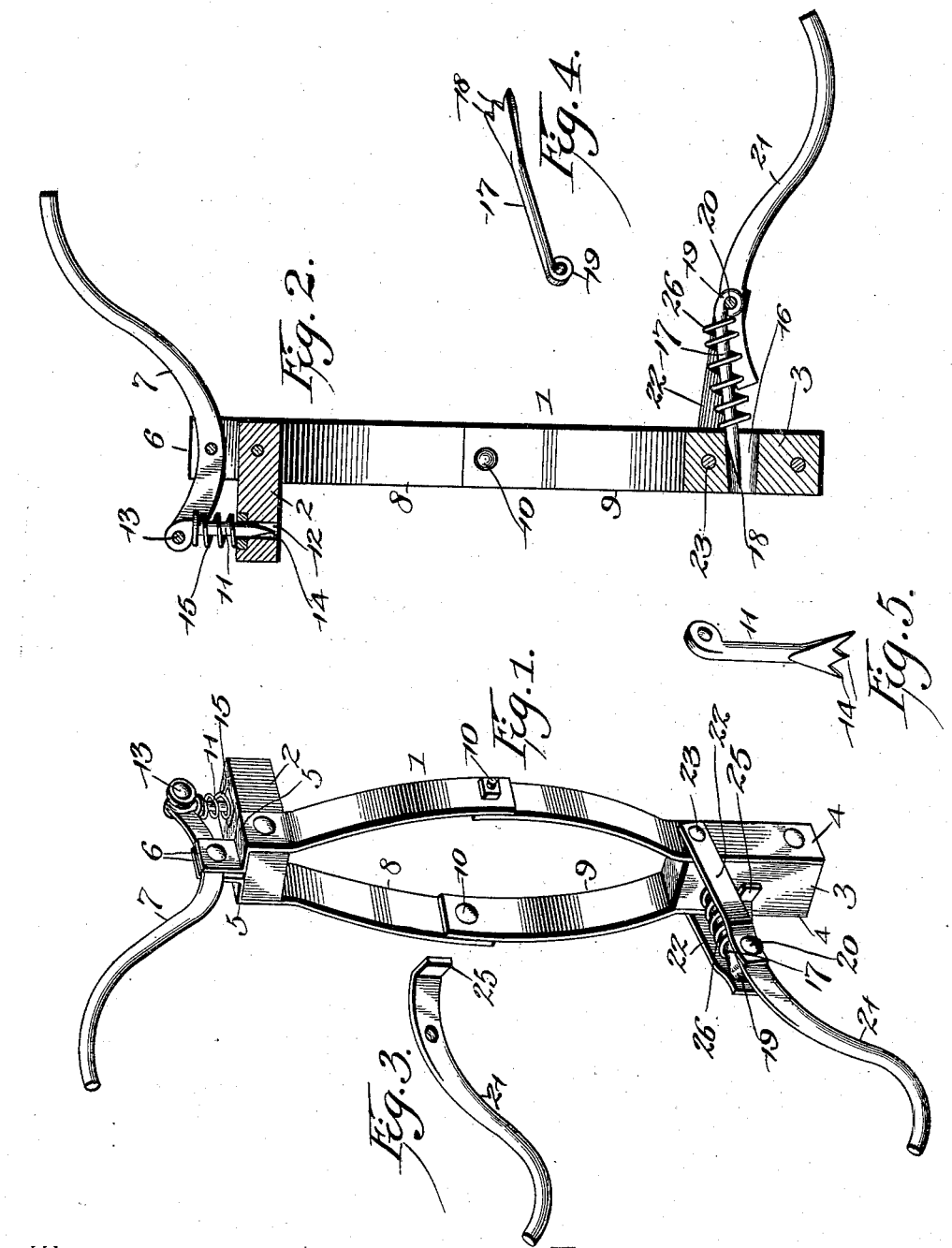

JEREMIAH ASBURY, OF LEXINGTON, OKLAHOMA TERRITORY.

ANIMAL-POKE.

SPECIFICATION forming part of Letters Patent No. 647,128, dated April 10, 1900.

Application filed June 3, 1899. Serial No. 719,262. (No model.)

*To all whom it may concern:*

Be it known that I, JEREMIAH ASBURY, a citizen of the United States, residing at Lexington, in the county of Cleveland, Oklahoma Territory, have invented a new and useful Animal-Poke, of which the following is a specification.

The invention relates to improvements in animal-pokes.

The object of the present invention is to improve the construction of animal-pokes and to provide a simple, inexpensive, and efficient device designed to be applied to various kinds of stock and capable of effectually preventing an animal from passing through or over a fence.

The invention consists in the construction and novel combination and arrangement of parts hereinafter fully described, illustrated in the accompanying drawings, and pointed out in the claims hereto appended.

In the drawings, Figure 1 is a perspective view of an animal-poke constructed in accordance with this invention. Fig. 2 is a longitudinal sectional view of the same. Fig. 3 is a detail perspective view of one of the levers. Fig. 4 is a similar view of one of the reciprocating rods. Fig. 5 is a similar view of the other rod.

Like numerals of reference designate corresponding parts in all the figures of the drawings.

1 designates a yoke designed to be arranged on the neck of an animal and composed of curved or outwardly-bowed sides constructed of metal or other suitable material and having their terminals secured to blocks 2 and 3, which are interposed between the ends of the sides, as clearly shown in Fig. 1 of the accompanying drawings. The lower terminals 4 of the sides are parallel and are arranged at opposite sides of the lower block 3, and the upper terminals 5 are angularly bent to fit the side and upper faces of the block 2 and are extended and perforated to form a standard comprising ears 6, between which is fulcrumed an upper lever 7. The sides are composed of upper and lower sections 8 and 9, pivotally connected at their adjacent ends by bolts 10 or other suitable fastening devices, whereby the yoke is adapted to break at the center to shorten the distance between its upper and lower ends, whereby the devices for prodding an animal are rendered more effective, as hereinafter described. The upper lever 7, which is fulcrumed near its inner end, has its outer portion inclined upward and curved, and its inner end is connected with an upper reciprocating needle 11. The needle 11, which is guided in an opening 12 of the upper block, is connected at its outer end by a pivot 13 with the upper lever, and its inner end is provided with a series of spurs 14, adapted, when the outer portion of the lever is swung backward, to engage the neck of an animal. The upper needle is normally held out of engagement with the neck of an animal by a coiled spring 15, disposed on the said needle and interposed between the upper face of the block 2 and the inner end of the lever.

The lower block 3 is provided with a perforation arranged at right angles to that of the upper block and forming a guide for a reciprocating needle 17, which is adapted to extend through the perforation 16 and engage an animal similar to the upper needle. The lower rod 17, which is provided at its inner end with spurs or projections 18, has an eye 19 at its outer end to receive a pivot 20, which forms a fulcrum for a lower lever 21 and which is supported by a pair of pivoted links or arms 22. The links or arms 22, which are located at opposite sides of the lower end of the yoke, extend outward therefrom substantially at right angles thereto, being pivoted at their inner ends by a bolt 23 or other suitable fastening device. The needle 17 and the lever are arranged between the links or arms 22, and the latter is fulcrumed between its ends on the pivot 20, and it is provided at its inner end with a laterally-extending lug 25, which is adapted to engage the adjacent link or arm. The rod is normally held at the outward limit of its movement by coiled springs 26, disposed on it and interposed between the block and the pivot 20. When the lever has its outer portion forced downward from the position illustrated in Figs. 1 and 2 of the accompanying drawings by being engaged with a fence or other obstruction, the needle 17 is forced inward and is adapted to engage the neck or breast of an animal. By mounting the lower lever 21 in the manner shown, its outer portion is adapted to swing upward independently of the rod and the links or arms to permit an animal to graze freely without forcing the needle 17 inward and prodding or pricking itself.

The upper and lower levers diverge, as shown, and should an animal endeavor to force its way through a fence or attempt to climb over the same the said levers will be further separated and will drive the needles into the neck of an animal at the top and bottom thereof, whereby the animal will be effectually deterred from moving forward. The levers are curved to clear the head of an animal, and they extend longitudinally or forward a sufficient distance to come in contact with obstructions other than fences and with trees and shrubbery should the animal attempt to feed on the same, and they will effectually prevent such attempts. The yoke is also adapted to break at the center, which will bring the reciprocating needles close together and at the same time operate to choke an animal, whereby the most stubborn animals will be rendered submissive.

The invention has the following advantages: The animal-poke, which is simple and comparatively inexpensive in construction, is applicable to all kinds of stock, and it is capable of effectually preventing the same from breaking down fences and other structures. The levers, which are located at the top and bottom of the yoke, are adapted to actuate the needles and carry the same into engagement with an animal, and, if necessary, the sides of the yoke will break at the pivot or joint, and thereby increase the effectiveness of the devices at the ends of the yoke and at the same time operate to choke an animal. The particular manner of mounting the lower lever permits the latter to swing upward in order not to interfere with the grazing of an animal.

Changes in the form, proportion, size, and the minor details of construction within the scope of the appended claims may be resorted to without departing from the spirit or sacrificing any of the advantages of this invention.

What is claimed is—

1. A device of the class described comprising a yoke adapted to be placed on the neck of an animal and provided with a suitable guide, a reciprocating needle mounted in the guide and arranged to prod or prick an animal, a lever fulcrumed on the yoke and pivotally connected with the needle, said lever extending from the yoke and arranged to engage a fence or other structure should an animal attempt to pass through the same, and adapted to move the rod inward, and means for holding the needle normally out of engagement with an animal, substantially as described.

2. A device of the class described comprising a yoke provided with suitable guides, upper and lower needles mounted in the guides, upper and lower levers connected with the needles and adapted to move the same inward, and springs for holding the needles normally at the outward limit of their movement, substantially as described.

3. A device of the class described comprising a yoke provided at its top with a guide-opening, a needle mounted in the guide-opening, a lever fulcrumed between its ends on the yoke and having its inner end connected with the needle, and a spring disposed on the needle and engaging the lever, substantially as described.

4. A device of the class described comprising a yoke, a needle guided on the yoke, an oscillating support connected with the needle, and a lever fulcrumed between its ends on the support and having its inner end engaging one side of the same, said lever having a limited pivotal movement independent of the support, substantially as described.

5. A device of the class described comprising a yoke, arms or links pivotally mounted on the yoke, a needle guided on the yoke and connected with the arms or links, a lever fulcrumed between its ends on the arms or loops and provided at its inner end with a lug arranged to engage one of them, said lever being adapted to swing upward, and a spring for holding the needle at the outward limit of its movement, substantially as described.

6. A device of the class described comprising a yoke, a pivotally-suspended needle arranged at the top of the yoke, and a lever fulcrumed on the yoke and arranged to actuate the needle, said lever being disposed longitudinally of the animal and extending forward or outward over the head of the same, whereby it is adapted to contact with trees, shrubbery and obstructions other than fences, substantially as described.

In testimony that I claim the foregoing as my own I have hereto affixed my signature in the presence of two witnesses.

JEREMIAH ASBURY.

Witnesses:
  A. HUTCHIN,
  GEO. R. WILSON.